United States Patent
Santos et al.

(10) Patent No.: US 8,046,704 B2
(45) Date of Patent: Oct. 25, 2011

(54) COMPLIANCE MONITORING

(75) Inventors: Ricardo Santos, Voorhees, NJ (US);
James F. Fus, Jr., Chicago, IL (US);
Amit Banerji, Bangalore (IN); Pushpak Bhattacharjee, Bangalore (IN)

(73) Assignee: Accenture Global Services Limited, Dublin (IE)

( * ) Notice: Subject to any disclaimer, the term of this patent is extended or adjusted under 35 U.S.C. 154(b) by 724 days.

(21) Appl. No.: 12/040,083

(22) Filed: Feb. 29, 2008

(65) Prior Publication Data
US 2008/0270207 A1 Oct. 30, 2008

Related U.S. Application Data

(63) Continuation-in-part of application No. 11/742,205, filed on Apr. 30, 2007.

(51) Int. Cl.
*G06F 3/048* (2006.01)
(52) U.S. Cl. .................................. 715/764; 715/705
(58) Field of Classification Search .................. 715/705, 715/764
See application file for complete search history.

(56) References Cited

U.S. PATENT DOCUMENTS

| | | | |
|---|---|---|---|
| 4,648,062 A | 3/1987 | Johnson et al. | |
| 6,330,710 B1 | 12/2001 | O'Neil et al. | |
| 6,862,589 B2 | 3/2005 | Grant | |
| 6,970,844 B1 | 11/2005 | Bierenbaum | |
| 7,328,420 B1 | 2/2008 | Datta et al. | |
| 7,415,696 B2 | 8/2008 | Cohen et al. | |
| 2002/0035541 A1 | 3/2002 | Makino et al. | |
| 2003/0231196 A1 | 12/2003 | Keohane et al. | |
| 2004/0220792 A1* | 11/2004 | Gallanis et al. | 703/13 |
| 2005/0010461 A1* | 1/2005 | Manos | 705/8 |
| 2005/0043025 A1 | 2/2005 | Durand | |
| 2005/0246154 A1 | 11/2005 | Kass et al. | |
| 2005/0278301 A1* | 12/2005 | Castellanos et al. | 707/3 |
| 2006/0116893 A1* | 6/2006 | Carnes et al. | 705/1 |
| 2006/0143161 A1* | 6/2006 | Munro | 707/3 |
| 2006/0212376 A1* | 9/2006 | Snyder et al. | 705/35 |
| 2007/0156851 A1* | 7/2007 | Tasci | 709/219 |
| 2007/0198368 A1 | 8/2007 | Kannan et al. | |
| 2007/0198420 A1* | 8/2007 | Goldstein | 705/52 |
| 2007/0214388 A1* | 9/2007 | Auvenshine et al. | 714/27 |
| 2010/0324952 A1* | 12/2010 | Bastos et al. | 705/7 |

OTHER PUBLICATIONS

England, USPTO Office Action in co-pending U.S. Appl. No. 11/742,205, mailed on Jul. 22, 2010 (13 pages), to be published by the USPTO with the file history of this application.
England, USPTO Office Action in co-pending U.S. Appl. No. 11/742,205, mailed on Oct. 5, 2010 (13 pages), to be published by the USPTO with the file history of this application.
England, USPTO Office Action in co-pending U.S. Appl. No. 11/742,205, mailed on Apr. 14, 2011 (16 pages), to be published by the USPTO with the file history of this application.

(Continued)

*Primary Examiner* — Sara England
(74) *Attorney, Agent, or Firm* — Fish & Richardson P.C.

(57) ABSTRACT

A system and method for determining compliance for one or more information technology services may generate on the spot compliance reports based on real-time data. Compliance data may be retrieved or received from a variety of sources including incident diagnostic utilities, manual data entry and third-party software or applications. A compliance system and method may monitor the data being generated from each of the various sources in a real-time fashion, generating compliance information based thereon.

18 Claims, 10 Drawing Sheets

OTHER PUBLICATIONS

Hanne, USPTO Office Action in co-pending U.S. Appl. No. 11/742,205, mailed on Sep. 30, 2009 (6 pages), to be published by the USPTO with the file history of this application.

Hanne, USPTO Office Action in co-pending U.S. Appl. No. 11/742,205, mailed on Jan. 22, 2010 (8 pages), to be published by the USPTO with the file history of this application.

* cited by examiner

| Parameter | Compliant | Non |
|---|---|---|
| Does Risk Mgmt Documents exist | Yes | No |
| Has the document been reviewed by the reviewer | Yes | No |
| Document reviewed within a specific time frame | Within Months defined | Outside months defined |

| Parameter | Compliant | Non |
|---|---|---|
| Do Remedies and Penalties exist | Yes | No |
| Have the penalties been reviewed by the reviewer | Yes | No |
| Document reviewed within a specific time frame | Within Months defined | Outside months defined |

COMPLIANCE MONITORING

CROSS-REFERENCE TO RELATED APPLICATIONS

The present invention is a continuation-in-part application of application Ser. No. 11/742,205, entitled "SYSTEM AND METHOD FOR PROVIDING SUPPORT ASSISTANCE" and filed on Apr. 30, 2007, the contents of which are incorporated herein by reference in its entirety.

BACKGROUND

In today's world, providing information technology services plays an important part in all aspects of business and personal life. Having a robust information technology infrastructure allows businesses to run seamlessly without significant manual intervention or involvement. In view of the importance and ubiquity of information technology, compliance standards have been set in place to insure data integrity and security. Currently, many businesses and organizations try to insure compliance by requesting audits on a periodic basis. However, oftentimes, such compliance is based on out of date information and thus, might not provide an accurate depiction of the compliance of information technology services and systems. Additionally, audits typically require weeks if not months of time, rendering on the spot compliance reports virtually impossible.

For the foregoing reasons, a system and method for determining compliance of information technology services is needed.

SUMMARY

Compliance monitoring includes monitoring one or more compliance data sources such as internal diagnostic utilities, manually entered data and/or third party applications. The data may be monitored in a real-time fashion and received by a compliance engine. The data may then be compiled and evaluated to determine a level of compliance based on predefined compliance objectives. For example, compliance objectives may correspond to various categories of data security and integrity. In another example, compliance objectives may be defined based on one or more industry standards for information technology governance. Once a level of compliance has been determined, a compliance report may be generated. The compliance report may include various types of information including a breakdown of compliance levels for different compliance areas, suggestions for improvements and an overall compliance score.

According to one or more aspects, compliance may be judged based on user interactions with process maps. Process maps generally refer to a set of process steps configured to guide a user through resolving an issue or providing a service. Compliance may thus be evaluated based on whether a user follows the process steps in an approved order, the amount of time spent on each process step, whether the process map was followed to the end, whether the service or issue was completed or resolved and the like. In one example, one aspect of compliance may correspond to a speed with which a user provides a service such as trouble shooting a technical issue.

According to another aspect, compliance reports may be generated "on the spot," in response to a user's request. Thus, in contrast to current auditing methods, compliance reports may be generated in a relatively short amount of time after a request is made. Auditing methods generally require days, weeks or months to complete. Further, users may request parameter specific compliance reports. That is, a user may specify that the compliance report should only include a particular time frame, service, user, department and/or combinations thereof.

These as well as other advantages and aspects of the invention are apparent and understood from the following detailed description of the invention, the attached claims, and the accompanying drawings.

BRIEF DESCRIPTION OF THE DRAWINGS

The present invention is illustrated by way of example and not limited in the accompanying figures in which like reference numerals indicate similar elements and in which:

FIGS. 10A & 10B illustrate conditions for compliance according to one or more aspects described herein.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
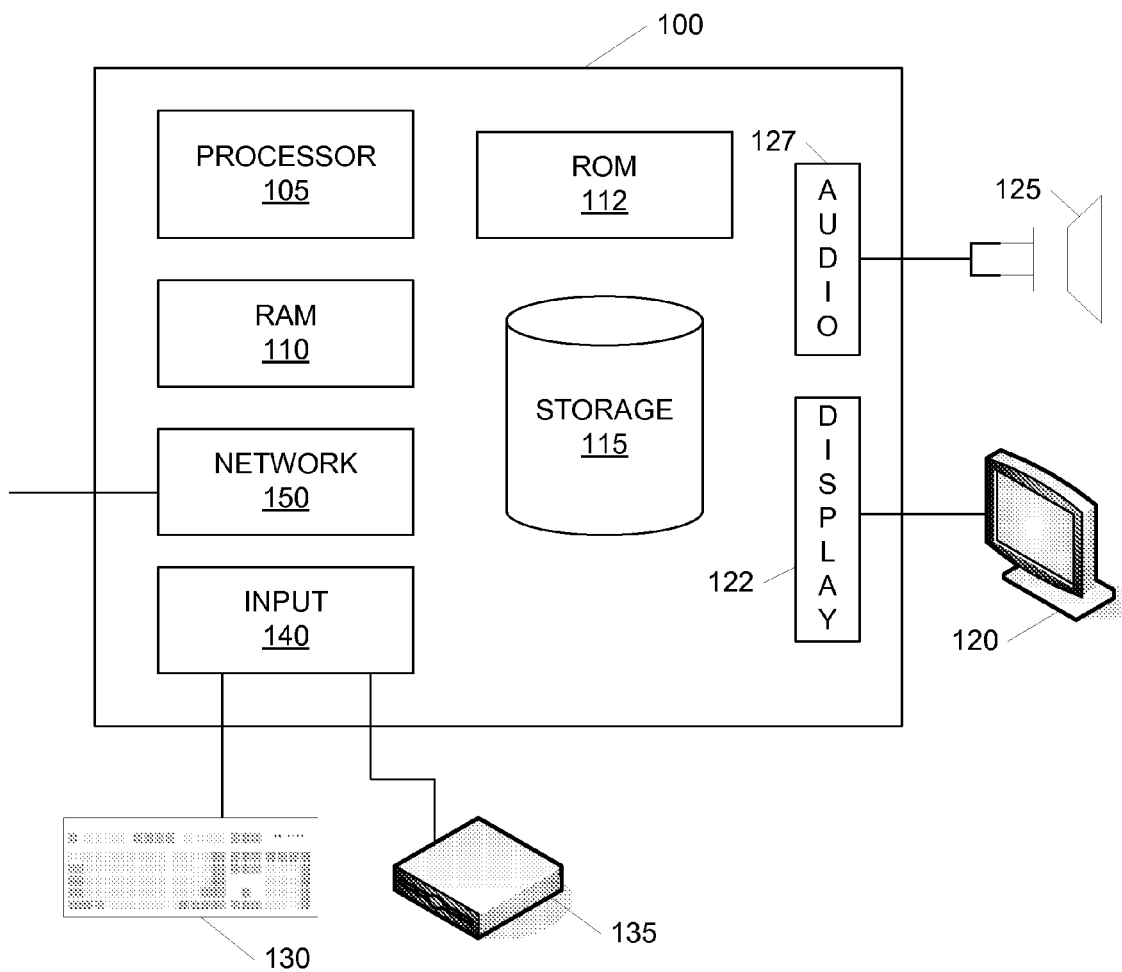
FIG. 1 illustrates a block diagram of a computing environment in which one or more aspects described herein may be implemented.

FIG. 1 illustrates a computing environment in which one or more aspects described herein may be implemented. A computing device such as computer 100 may house a variety of components for inputting, outputting, storing and processing data. For example, processor 105 may perform a variety of tasks including executing one or more applications, retrieving data from a storage device such as storage 115 and/or outputting data to a device such as display 120. Processor 105 may be connected to Random Access Memory (RAM) module 110 in which application data and/or instructions may be temporarily stored. RAM module 110 may be stored and accessed in any order, providing equal accessibility to the storage locations in RAM module 110. Computer 100 may further include Read Only Memory (ROM) 112 which allows data stored thereon to persist or survive after computer 100 has been turned off. ROM 112 may be used for a variety of purposes including for storage of computer 100's Basic Input/Output System (BIOS). ROM 112 may further store date and time information so that the information persists even through shut downs and reboots. In addition, storage 115 may provide long term storage for a variety of data including applications and data files. Storage 115 may include any of a variety of computer readable media such as disc drives, optical storage mediums, magnetic tape storage systems, flash memory and the like. In one example, processor 105 may retrieve an application from storage 115 and temporarily store the instructions associated with the application RAM module 110 while the application is executing.

Computer 100 may output data through a variety of components and devices. As mentioned above, one such output device may be display 120. Another output device may include an audio output device such as speaker 125. Each output device 120 and 125 may be associated with an output adapter such as display adapter 122 and audio adapter 127, which translates processor instructions into corresponding audio and video signals. In addition to output systems, computer 100 may receive and/or accept input from a variety of input devices such as keyboard 130, storage media drive 135 and/or microphone (not shown). As with output devices 120 and 125, each of the input devices 130 and 135 may be associated with an adapter 140 for converting the input into computer readable/recognizable data. In one example, voice input received through microphone (not shown) may be converted into a digital format and stored in a data file. In one or more instances, a device such as media drive 135 may act as both an input and output device allowing users to both write and read data to and from the storage media (e.g., DVD-R, CD-RW, etc.).

Computer 100 may further include one or more communication components for receiving and transmitting data over a network. Various types of networks include cellular networks, digital broadcast networks, Internet Protocol (IP) networks and the like. Computer 100 may include adapters suited to communicate through one or more of these networks. In particular, computer 100 may include network adapter 150 for communication with one or more other computer or computing devices over an IP network. In one example, adapter 150 may facilitate transmission of data such as electronic mail messages and/or financial data over a company or organization's network.

In another example, adapter 150 may facilitate transmission or receipt of information from a world wide network such as the Internet. Adapter 150 may include one or more sets of instructions relating to one or more networking protocols. For example adapter 150 may include a first set of instructions for processing IP network packets as well as a second set of instructions associated with processing cellular network packets. In one or more arrangements, network adapter 150 may provide wireless network access for computer 100.

One of skill in the art will appreciate that computing devices such as computer 100 may include a variety of other components and is not limited to the devices and systems described in FIG. 1.

Computing devices such as computer 100 of FIG. 1 are often used in carrying out information technology solutions for achieving various business goals. However, information technologies vary greatly in levels of security, quality and integrity and thus, may often create uncertainty in the safety and reliability of data processed there through. To combat such uncertainty, organizations have developed guidelines and standards to help promote the security, quality and integrity of information technology. For example, Control Objectives for Information and related Technology (COBIT) represents a set of standards and ideas created to help optimize business investments in information technology, ensure service delivery and provide a benchmark for judging information technology. Thus, a business may wish to evaluate its information technology services against standards such as COBIT to insure compliance. In one or more arrangements, compliance may be measured based on the amount of time it takes for a user to complete a process step, customer polls relating to satisfaction, whether a resolution was reached, whether notes were kept, how and/or when a process tool is used and the like. Additional information relating to COBIT may be found at http://www.isaca.org/Template.cfm?Section=COBIT6&Template=/TaggedPage/TaggedPageDisplay.cfm&TPLID=55&ContentID=31519.

Figure 2:
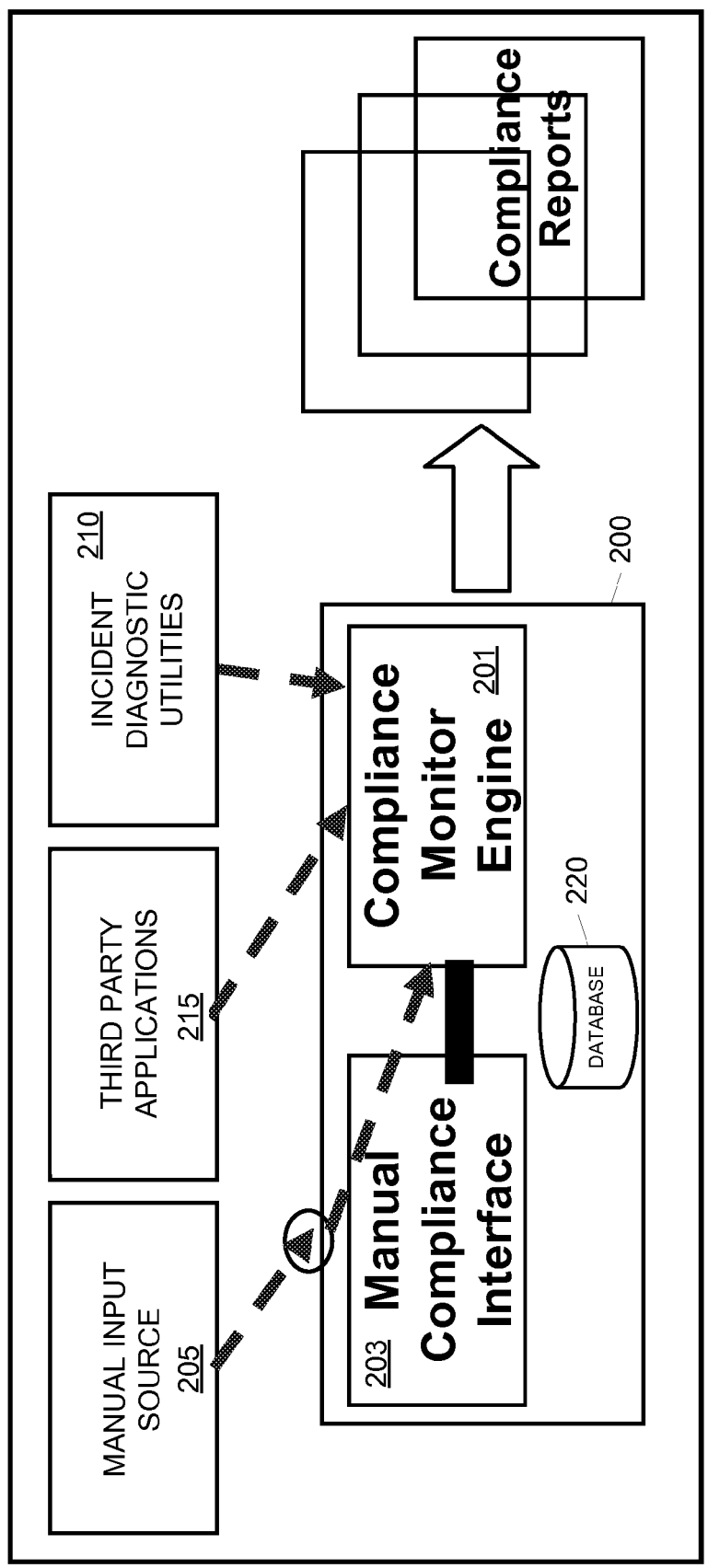
FIG. 2 illustrates a compliance monitoring system for determining compliance across multiple systems and processes according to one or more aspects described herein.

FIG. 2 illustrates a system for monitoring compliance of information technology solutions and personnel with one or more standards or objectives. The standards and objectives may be defined and inputted into compliance monitor 200, which is configured to monitor data from a variety of sources including manual input sources 205, incident diagnostic utilities 210 and third-party applications and systems 215. In contrast to current auditing methods, compliance monitor 200 may perform compliance monitoring in a real-time manner. Stated differently, compliance monitor 200 may evaluate the compliance of a particular information technology process as data relating to the process is generated or detected. In one example, a compliance monitor may monitor how long it takes for information technology (IT) support personnel to resolve an issue raised by a client. In another example, a compliance monitor may receive information relating to the sufficiency of IT risk management documentation as it is uploaded or entered into a system.

Compliance monitor 200 may include a compliance monitor engine 201 configured to receive and process compliance information received from the various compliance information sources 205, 210 and 215. Thus, each of sources 205, 210 and 215 may be monitored and data may be received therefrom through a data network. In one example, compliance monitor 200 may monitor the accuracy of captured or received data and detect any updates to the data. Compliance monitor 200 may further include manual compliance interface 203 that is configured to receive user input corresponding to analysis of the compliance data. For example, a user may use the manual compliance interface 203 to manually evaluate the level of compliance of various processes with the compliance objectives and enter data corresponding to the user's evaluation. The compliance monitor 200 may further generate compliance reports based on the various data and input received from data sources 205, 210 and 215 and/or manual compliance interface 203.

Manual input source 205 may allow a user to enter data or upload information to compliance monitor 200 for analysis. For example, a user may be presented with a compliance form that requests responses to a series of compliance questions. Further, the form may request the uploading of various documents that are required as part of compliance review.

Figure 3:
FIG. 3 illustrates a compliance data source including a manual entry interface according to one or more aspects described herein.

FIG. 3 illustrates a manual entry interface 300 that is configured to receive compliance data. As illustrated, interface 300 may include entry areas 305 and 310 for indicating whether certain documentation or plans exist. The document or plan may be linked using fields 315 and 320. Further, information about the document or plan such as a date of creation may be specified in entry field 325. As discussed, one or more aspects of an IT plan or structure may be reviewed manually by an authorized individual. In such instances, interface 300 may further include entry fields 330 and 335 for reviewing information such as name of the designated reviewer, a date on which the document or plan was last reviewed and a required or preferred frequency of review.

Referring again to FIG. 2, manual input source 205 may thus be used to collect a variety of information and documents that may require manual identification and/or review. Compliance monitor 200 may thus use the collected data as a further measure of compliance. For example, one compliance objective may correspond to the existence of a particular document. Accordingly, if the particular document is determined to exist (e.g., through a manual identification of the document), the compliance objective may be considered satisfied.

Incident diagnostic utilities 210 generally relate to applications that are configured to aid in the resolution of an incident. Incident diagnostic utilities 210 may monitor for various types of data including times (e.g., time required to resolve an issue), data sufficiency (e.g., the amount of data requested versus the amount of data entered), workflow (e.g., the order of steps that were taken in resolving an issue) and the like to aid in determining a level of compliance of information technology being used. In one or more arrangements, incident diagnostic utilities 210 may include process maps that are designed to guide support personnel through a resolution process. These process maps may be interactive and provide a step-by-step manual on how to resolve a problem or inquiry. Thus, in one embodiment, by detecting and monitoring personnel interaction with such process maps, compliance may be measured. For example, the amount of time it takes for a support individual to reach a particular step in a process map may be compared to a predefined threshold time to determine compliance.

Process maps, as used herein, generally refer to a set of process steps that are linked to form a process flow. Support personnel and other users may use process maps to help identify a solution to one or more issues. For example, a client calling for technical troubleshooting may be aided by an individual using a process map. The process map may guide the individual through asking certain questions, requesting certain types of information and/or using various applications for resolving the issue or problem. Process maps may also be interactive. For example, upon selection of a process step, an application corresponding to the step may automatically be launched. Alternatively or additionally, selecting a process step may allow a user to enter notes or data in association with the selected step.

Additionally, activities of a process map user may automatically be tracked by the process map or a background process corresponding thereto. In one or more configurations, the service application may initiate a background process that tracks the amount of time spent on each process step, the actions taken by the support personnel (e.g., clicking on a link, activating an application or applet), notes taken by the support personnel and other related information. A tracker or logger may be activated automatically upon selection of a process map or activation of a service application. Alternatively or additionally, logging activation may be controlled manually by a user. Further details relating to process maps may be found in U.S. application Ser. No. 11/742,205, entitled "System and Method for Providing Support Assistance" and filed Apr. 30, 2007.

Third-party applications and systems 215 are also used to resolve or aid in resolving problems that may arise. In one example, a third-party product may provide an interface for resetting or retrieving lost passwords and updating profile information. In another example, a third-party system may be used to provide data security. Accordingly, data recorded and/or generated by such third-party products may be used as a further metric for analyzing compliance of a particular service. For example, third-party systems and applications 215 may provide statistics as to the number of lost or forgotten passwords during a predefined period. Such statistics may, if relevant, be used as a component of determining compliance.

Additionally or alternatively, data that is received from one or more sources such as manual input sources 205, incident diagnostic utilities 210 and third-party applications and systems 215 may be stored in database 220. Compliance monitor 200 may be configured to retrieve data from database 220, for example, when evaluating compliance and generating compliance reports. Database 220 may also store specified control objectives, thresholds and goals relating to compliance. Storing data in database 220 may further allow compliance monitor 200 to generate comparative or historical reports based on past performance.

Figure 4:
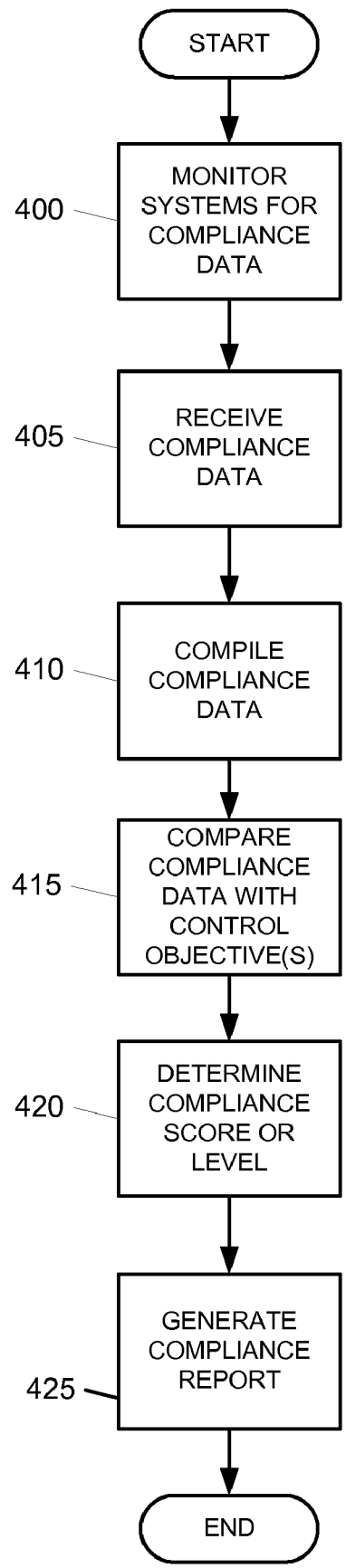
FIG. 4 is a flowchart illustrating a method for determining compliance of one or more information technology services according to one or more aspects described herein.

FIG. 4 is a flowchart illustrating a method for determining compliance of one or more information technology services. In step 400, a compliance system (e.g., compliance monitor 200 of FIG. 2) may monitor one or more information technology services or systems. In step 405, the compliance system may receive compliance related data as a product of the monitoring. In particular, the compliance system may receive real-time data relating to the processes being performed by support personnel, internal applications or third-party IT products. For example, the compliance system may receive compliance data tracked by a process map being used by support personnel to resolve an incident as the incident is being resolved. In another example, the compliance system may receive up-to-date statistics relating to failed logins from a third-party IT platform. Upon receiving the compliance relevant data, the compliance system may compile the data in one or more manners in step 410. For instance, data in the same category (e.g., risk management or data security) may be grouped into one database or one collection. Various statistics may also be determined during the compilation phase including averages, standard deviations, maximums and minimums and the like.

In step 415, the compliance system may compare the received data with one or more compliance objectives or standards to determine a level of compliance. By way of example, a number of security breaches may be compared to a threshold number of security breaches to determine a level of compliance of a particular compliance objective. Compliance may also be measured based on whether various plans or documents exist, whether documents or plans have been reviewed in accordance with a designated frequency of review and the like. The various comparisons of the received data with the one or more compliance objectives may then be compiled in step 420 to determine or generate an overall compliance score or level. In one arrangement, a compliance level or score may be determined for each compliance objective and/or process according to the above process prior to generating an overall service compliance score or level (e.g., in step 420). For example, if 3 out of 5 requirements of a compliance objective have been satisfied, a compliance score of 80% may be assigned to that compliance objective. Determining the overall compliance score or level, on the other hand, may include averaging the various compliance scores or levels. Various algorithms and/or formulas may also be used to determine a compliance score. In one example, different objectives or requirements of an objective may be weighted differently in generating the overall compliance score or level. For example, data security objectives may be weighted more heavily than data integrity objectives.

In step 425, one or more compliance reports may be generated. The compliance report may provide an overall compliance score, a breakdown of categories of compliance objectives, suggestions or guidelines for improvement and/or combinations thereof. Alternatively or additionally, comparing the monitored data and the compliance objectives may also include the identification of business risks relating to the determined compliance score or level. The business risks may specify which areas of a businesses technology infrastructure are exposed to potential attack or failure if one or more corresponding objectives are non-compliant.

According to one or more aspects, retrieving compliance data, determining compliance levels and generating compliance reports (e.g., steps 405-425) may be performed in response to a request for compliance information. Thus, in contrast to present auditing methods requiring days, weeks and even months to audit a set of data that may be outdated, a client or other entity may request "on the spot" compliance reports that are generated based on real-time data. "On the spot" compliance reports may be generated in the matter of seconds, minutes or hours.

Compliance scores and levels may be calculated using a variety of formulas and algorithms. In one arrangement, a compliance score for a process map may be determined by identifying a total number of control points having trace based controls, M, in the process map and a number of compliant control points having trace based controls, L. Control points, as used herein, refers to a process step or other point in a process map that is associated with a control objective. A percentage compliance of trace based control points may thus be determined using the formula: L/M. Cycle time based controls points may be evaluated in similar fashion by determining a percentage based on the total number of cycle time controls, X, and the number of cycle time control points where cycle time was recorded, Y. A total compliance including both trace based control points and cycle time control points may further be determined based on the formula: (L+Y)/(M+X).

Cycle time control points, as used herein, refer to processes or process steps that are evaluated based on time. Stated differently, a compliance monitor may determine an amount of time used to complete a process or process step and compare that amount of time to a predefined threshold time to determine compliance. Thus, if a particular process step takes five minutes for support personnel to complete, that measured time may be compared with a threshold of three minutes in determining that the personnel was non-compliant in completing the step. Trace based control points, on the other hand, refer to processes or process steps for which interaction and/or completion is monitored. That is, a trace based control point may detect whether the process or step has been addressed or completed to determine compliance. Thus, if a process or process step was not address or completed, a compliance monitor may determine that an operating user was not compliance in his or her use.

Figure 5:
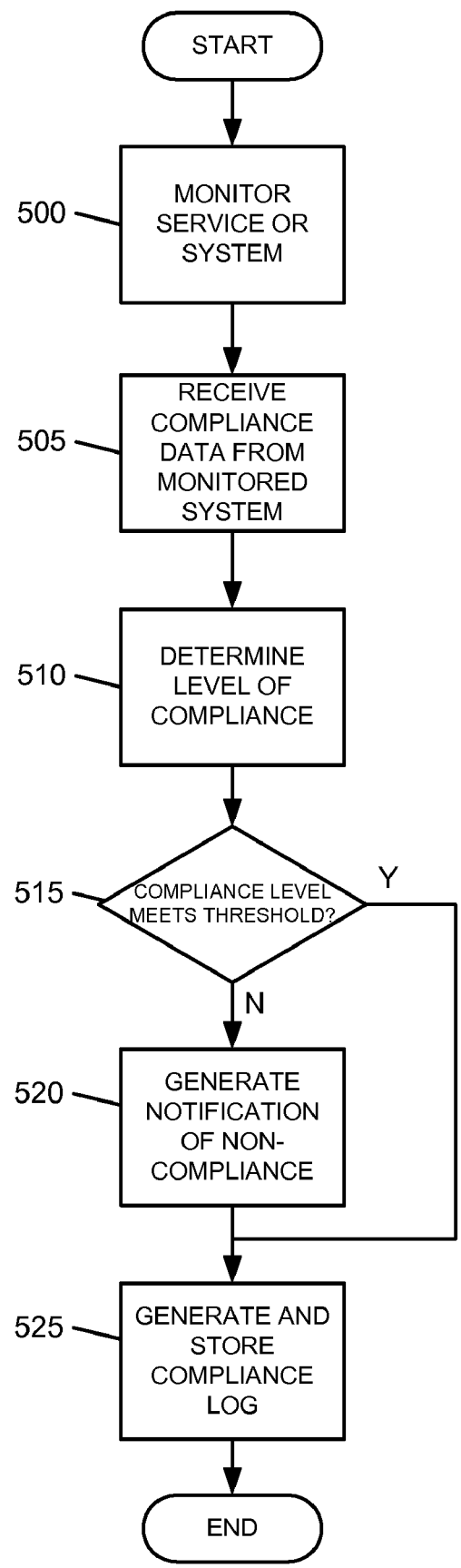
FIG. 5 is a flowchart illustrating a method for monitoring compliance according to one or more aspects described herein.

In addition to analyzing and monitoring the overall compliance of a business' technology infrastructure, a compliance monitoring system may also evaluate the compliance of a particular process or service. FIG. 5 illustrates a method for monitoring the compliance of an information technology service provided to a client. In step 500, a service, such as technical support, or system may be monitored. That is, data associated with the service being provided or process being performed may be received by the compliance system. In one or more arrangements, such data may be transmitted in real-time or according to periodic or aperiodic updates. In step 505, the compliance system may determine whether the incident has been resolved and/or whether service has been completed. If not, the compliance system may continue monitoring the service task or incident. If, however, the incident has been resolved or service has been completed, the compliance system may determine a level of compliance of the service provided based on the data received during the monitoring phase in step 510.

Upon determining the level of compliance, the compliance system may subsequently determine whether the level of compliance meets a predefined compliance threshold in step 515. If the level of compliance fails to meet the threshold, a notification may be automatically generated and transmitted to one or more individuals associated with governing the provided service in step 520. The one or more individuals may include a group manager, a department head, a shift supervisor and the like. In step 525, a log of the service and the determined level of compliance may be stored. In one or more configurations, the log and/or determined level of compliance may be recorded regardless of whether the threshold of compliance was met.

Figure 6:
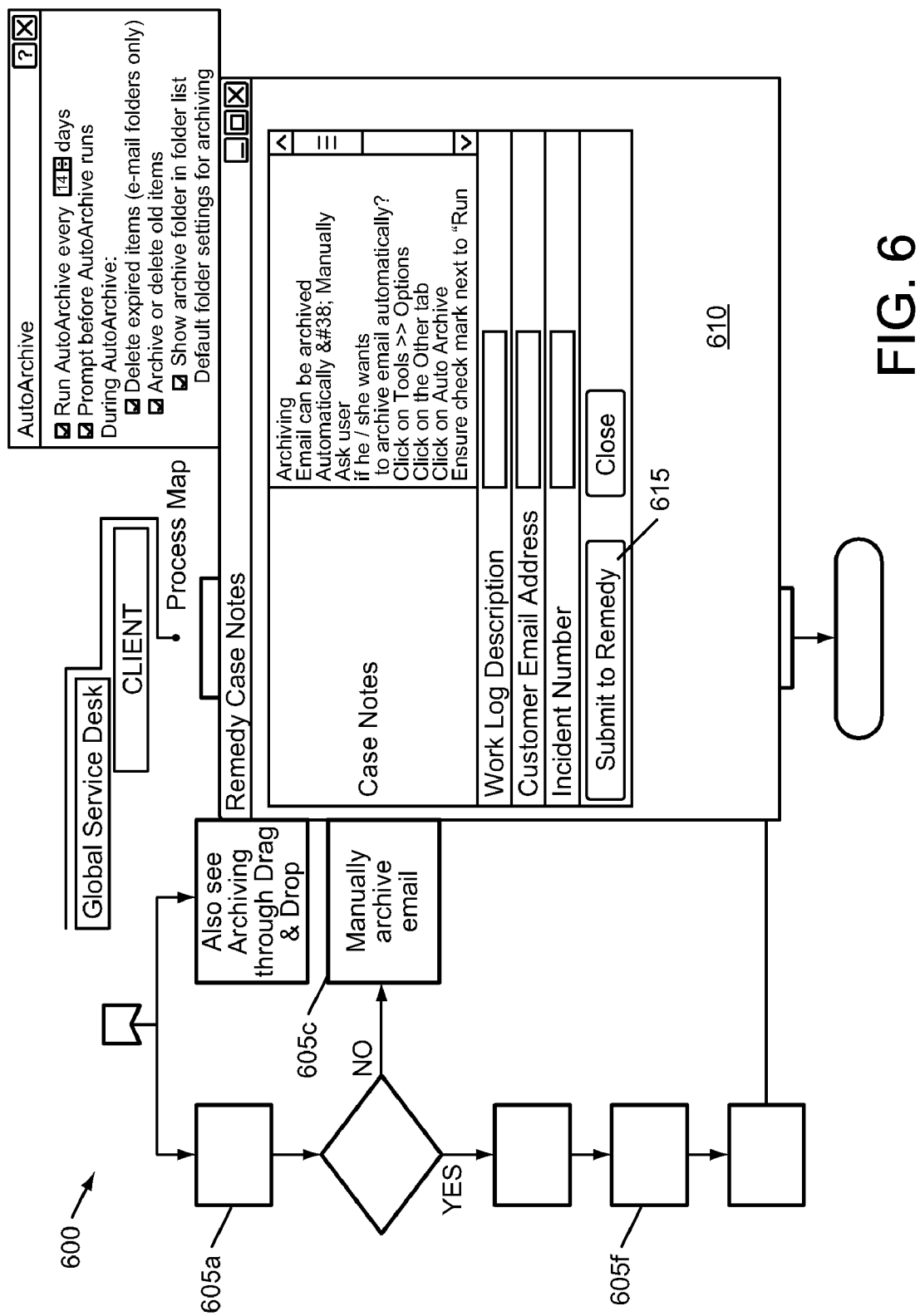
FIG. 6 illustrates a process map configured to guide users through providing support according to one or more aspects described herein.

As discussed, in one or more arrangements, compliance may be measured based on metrics associated with the use of process maps. FIG. 6 illustrates a process map wherein various metric tools may be integrated. Each of the process steps in map 600 may include a detection module that is configured to determine whether the corresponding step has been activated or selected (e.g., indicating that the step was followed). The detection module allows a compliance monitor to determine various types of compliance including whether the department, individual or organization using the process map is following the proper steps in resolving a situation, whether the steps were followed in a specified order and whether the amount of time spent on a particular steps or series of steps was within an acceptable range. For example, selecting or otherwise interacting with process step 605*a* may activate a timer while selection or interaction with process step 605*f* may cause the timer to stop and an elapsed amount of time to be determined. In another example, the amount of time spent on one step may be calculated based on the amount of time between selection of a first step and the selection or interaction with a second subsequent step.

Process step 605*c* illustrates the integration of applications and other functions into the activation of a process step. That is, selecting or otherwise interacting with process step 605*c* may cause an application or function such as data entry form 610 to launch. A user may subsequently enter data into form 610 and select SUBMIT option 615 upon completion. Once the process step 605*c* has been addressed, the process step 605*c* may change in appearance. For example, process step 605*c* may change color (not shown) to indicate that the process step has been completed or a label COMPLETE (not shown) may be added to process step 605*c*.

In one or more arrangements, certain functions or interactions of a process step might not become active until interaction with another process step has been detected. In the above timer example, for instance, the function for stopping the timer might not be activated for process step 605*f* until interaction with process step 605*a* has been detected. In another example, a process map might require the entry of certain data prior to allow a password to be reset. Thus, a password reset process step might not be activated or interaction with the password reset step might not be possible until the process step of entering data has been completed. Such a feature may allow more structured control of how a process map is used and how the process steps are followed.

Additionally or alternatively, compliance may also be evaluated based on whether documents and plans have been reviewed and/or approved. For example, a risk management plan and a periodic or aperiodic review thereof may be required as part of a set of compliance objectives. In such instances, the compliance monitor may monitor whether the risk management plan has expired (i.e., not been re-approved or reviewed according to a predefined schedule). If so, the level of compliance may be negatively affected and the compliance monitor may issue a notification requesting review or re-approval of the plan.

Figure 7:
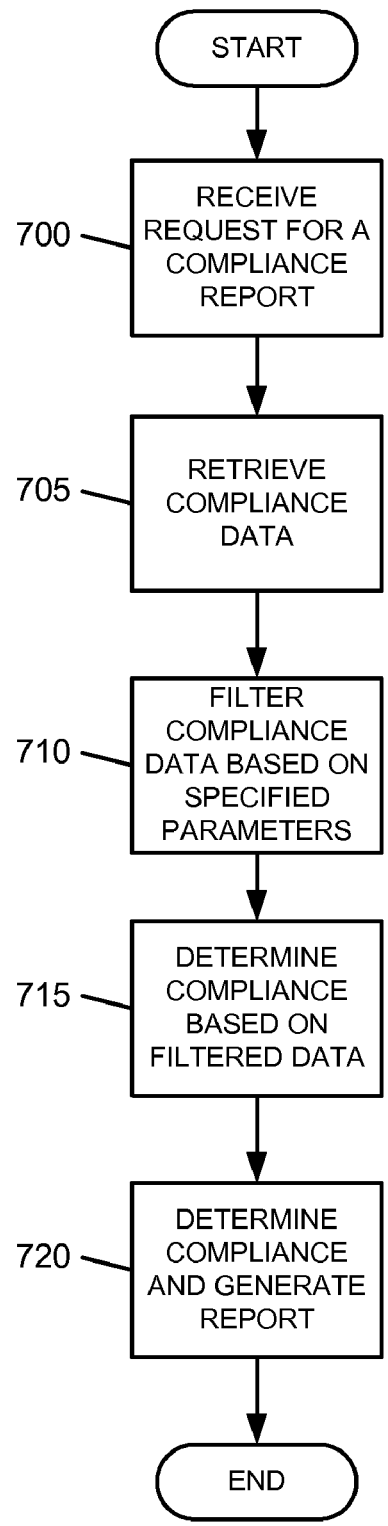
FIG. 7 is a flowchart illustrating a method for processing and generating parameter specific compliance reports according to one or more aspects described herein.

According to one aspect, a compliance monitoring system such as compliance monitor 200 of FIG. 2 may also be configured to generate reports that are specific to a specified parameter. For example, a report may be generated for a particular client, issue and/or service. FIG. 7 illustrates a method for generating parameter specific compliance reports. In step 700, for example, a request may be received for a compliance report. The request may include one or more parameters specifying a range of information that is being requested. These parameters may include a type of service, a client name, a type of issue or problem, dates and the like. In step 705, a compliance monitoring system may retrieve compliance data from a database or from one or more sources being monitored by the system. For example, the compliance monitoring system may receive data from an incident diagnostic utility. Upon receipt of the compliance data, the data may be filtered using the specified parameters in step 710.

Once the compliance data has been filtered, the compliance monitoring system may determine a level of compliance using the remaining data in step 715. Further, a compliance report may be generated in step 720, specifying the compliance findings and identifying particular areas of compliance or non-compliance, details regarding compliance objectives, follow-up tasks and suggestions for improvement.

Figure 8:
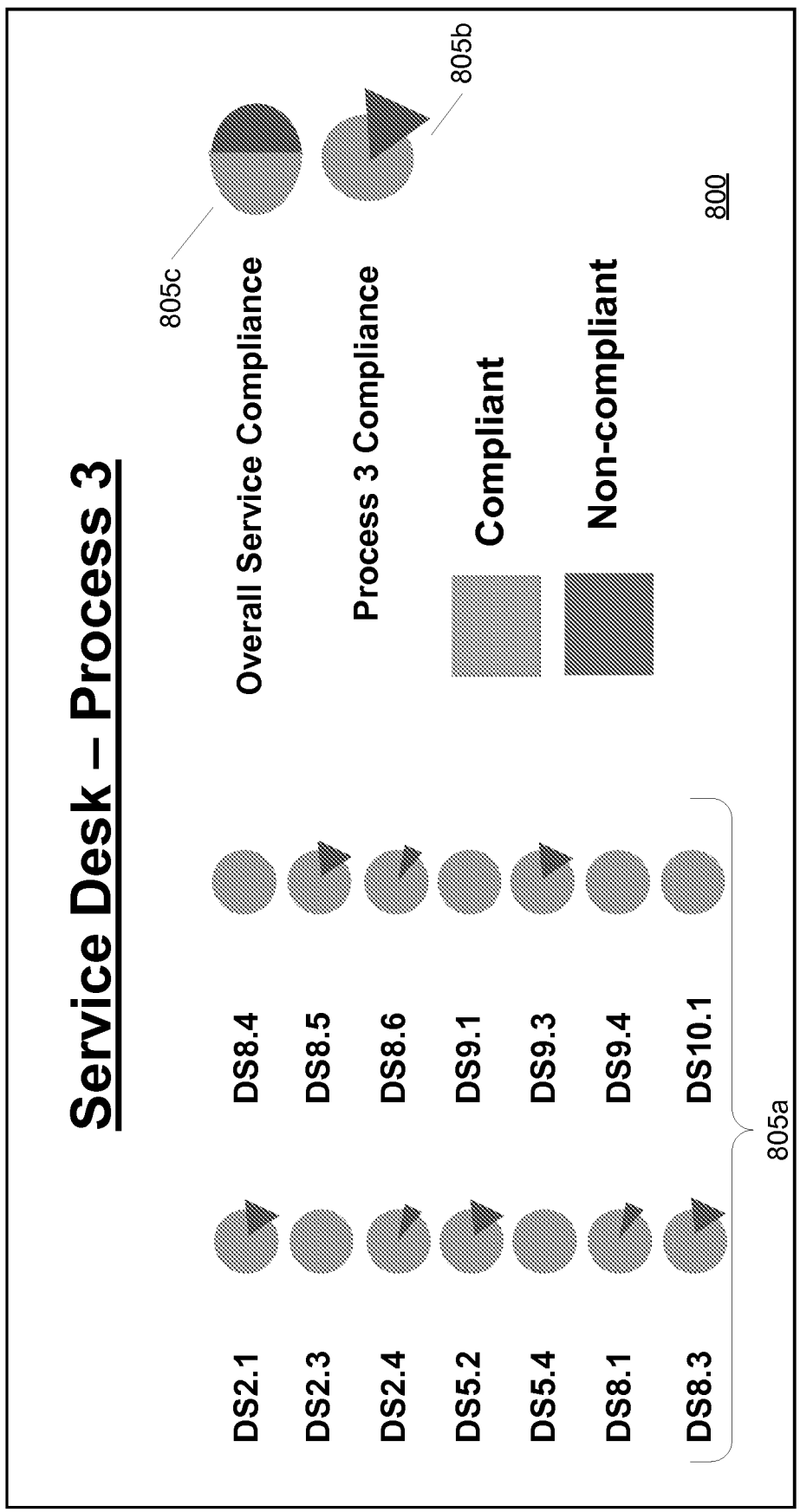
FIG. 8 illustrates a manner of conveying compliance in a compliance report according to one or more aspects described herein.

FIG. 8 illustrates various methods for and types of compliance reporting that may be used, e.g., in a compliance report. Interface 800 may include multiple pie charts 805 corresponding to multiple compliance objectives, i.e., DS2.1-DS10.1, overall service compliance and a process compliance. In the arrangement shown, compliance is identified by a color coded slice in each chart. Each of the compliance objective charts 805a convey the compliance of a particular process, e.g., process 3, with respect to each objective while chart 805b conveys the overall compliance of the process. For example, chart 805b may be a composite chart of all of objective charts 805a. Further, overall service compliance chart 805c corresponds to a compliance of all processes of a particular service (e.g., a service desk service).

Figure 9:
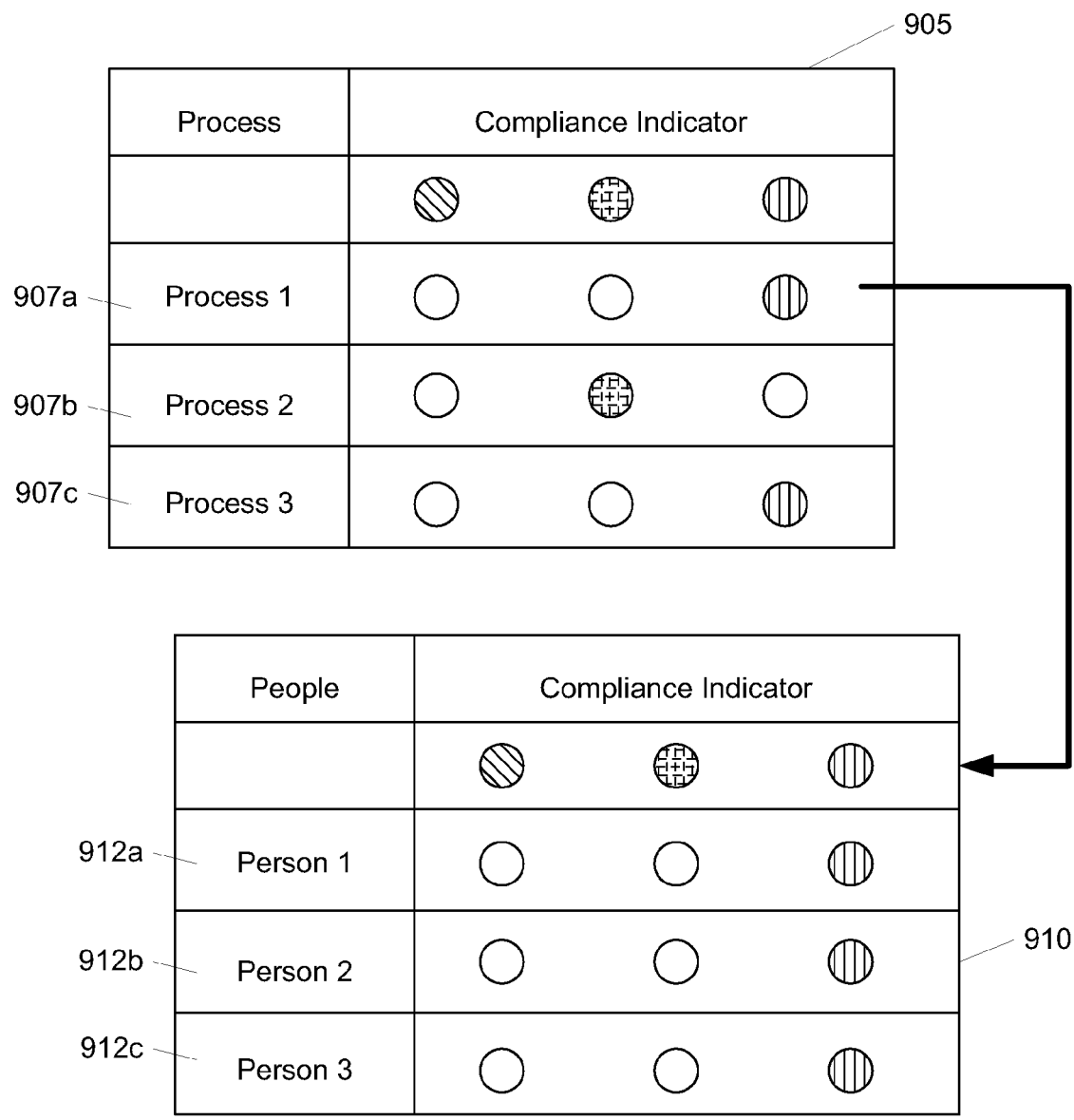
FIG. 9 illustrates an alternative or additional manner of conveying compliance levels in a compliance report according to one or more aspects described herein.

FIG. 9 illustrates a user interface displaying an alternative or additional method of indicating compliance, i.e., using compliance indicators 905 and 910. Compliance indicator 905 may be configured to display compliance for each of process steps 907 in a process map while indicator 910 may be configured to display the compliance of personnel 912 for a particular process step (e.g., process step 907b). In the arrangement shown, compliance indicators 905 and 910 may each indicate performance based on three colors where each color corresponds to a level of compliance. In one example, green may indicate full compliance, yellow partial compliance and red non-compliance. A variety of indicators may be used in place of or in conjunction with the color indicators. For example, a rating of 1-10, shape indicators and/or "YES" or "NO" indicators may be used. Alternatively or additionally, compliance indicator 910 may be accessed by selecting one of the process steps of compliance indicator 905. That is, by selecting one of the process steps of indicator 905, detailed information about personnel compliance may be displayed in indicator 910.

FIGS. 10A and 10B illustrate compliance evaluation charts that specify conditions for compliance and non-compliance of a risk management document and a contract, respectively. In FIG. 10A, chart 1000a indicates that achieving compliance includes having a risk management document, having the document reviewed by a reviewer and that the document is reviewed within a designated time frame. In FIG. 10B, chart 1000b shows that compliance is dependent upon whether remedies and penalties exist in the contract, whether the penalties have been reviewed by a reviewer and whether the document was reviewed within a specified time frame. Other compliance objectives may also be used in addition to or as an alternative to those illustrated.

According to one aspect, compliance reports may be generated based on specified time frame or period. Thus, a user may specify a particular time period for which he or she would like the monitor to generate a compliance report. The time period may be a specified time period leading up to the present or may be a period occurring in the past. Accordingly, compliance reports may be generated using select portions of historic data relating to controls, processes and/or services.

Additionally, the methods and features recited herein may further be implemented through any number of computer readable media that are able to store computer readable instructions. Examples of computer readable media that may be used include RAM, ROM, EEPROM, flash memory or other memory technology, CD-ROM, DVD or other optical disk storage, magnetic cassettes, magnetic tape, magnetic storage and the like.

The present invention has been described in terms of preferred and exemplary embodiments thereof. Numerous other embodiments, modifications and variations within the scope and spirit of the appended claims will occur to persons of ordinary skill in the art from a review of this disclosure.

We claim:
1. A computer implemented method comprising:
monitoring one or more processes being performed by information technology (IT) support personnel, wherein the processes are performed using an interactive process map that guides the IT support personnel through resolving an IT issue or providing an IT solution; and
receiving a request for a compliance report, then:
receiving, from the monitored processes, real-time data that specifies an actual amount of time taken for the IT support personnel to reach a particular step in the process map,
automatically determining an extent to which the monitored processes comply with the IT standard by comparing the received real-time data to one or more compliance parameters associated with an IT standard, wherein the one or more compliance parameters specify a predefined threshold time associated with reaching the particular step in the process map, and
generating a compliance report that specifies the extent to which the monitored processes comply with the IT standard.

2. The method of claim 1, wherein generating a compliance report that specifies an extent to which the monitored processes comply with the IT standard comprises generating a compliance report that specifies an extent to which the monitored processes comply with the Control Objectives for Information and related Technology (COBIT) standard.

3. The method of claim 1, wherein receiving the real-time data comprises:
   providing a manual input source to allow the IT support personnel to enter or upload the real-time data; and
   receiving the real-time data through the manual input source from the IT support personnel.

4. The method of claim 1, wherein automatically determining an extent to which the monitored processes comply with the IT standard further comprises automatically determining whether particular documentation identified by the IT support personnel actually exists.

5. The method of claim 1, wherein automatically determining an extent to which the monitored processes comply with the IT standard further comprises automatically determining whether an amount of data requested matches an amount of data entered.

6. The method of claim 1, wherein automatically determining an extent to which the monitored processes comply with the IT standard further comprises comparing an actual number of security breaches to a threshold number of security breaches associated with the compliance parameters.

7. The method of claim 1, comprising:
   determining that the monitored processes fail to comply with the IT standards, then generating and transmitting a message to one or more individuals associated with governing the processes.

8. The method of claim 1, wherein the compliance report comprises multiple color-coded pie charts that each correspond to a compliance objective of the IT standard.

9. A system comprising:
   one or more computers; and
   a computer-readable medium coupled to the one or more computers having instructions stored thereon which, when executed by the one or more computers, cause the one or more computers to perform operations comprising:
   monitoring one or more processes being performed by information technology (IT) support personnel, wherein the processes are performed using an interactive process map that guides the IT support personnel through resolving an IT issue or providing an IT solution; and
   receiving a request for a compliance report, then:
      receiving, from the monitored processes, real-time data that specifies an actual amount of time taken for the IT support personnel to reach a particular step in the process map,
      automatically determining an extent to which the monitored processes comply with the IT standard by comparing the received real-time data to one or more compliance parameters associated with an IT standard, wherein the one or more compliance parameters specify a predefined threshold time associated with reaching the particular step in the process map, and
      generating a compliance report that specifies the extent to which the monitored processes comply with the IT standard.

10. The system of claim 9, wherein generating a compliance report that specifies an extent to which the monitored processes comply with the IT standard comprises generating a compliance report that specifies an extent to which the monitored processes comply with the Control Objectives for Information and related Technology (COBIT) standard.

11. The system of claim 9, wherein receiving the real-time data comprises:
   providing a manual input source to allow the IT support personnel to enter or upload the real-time data; and
   receiving the real-time data through the manual input source from the IT support personnel.

12. The system of claim 9, wherein automatically determining an extent to which the monitored processes comply with the IT standard further comprises automatically determining whether particular documentation identified by the IT support personnel actually exists.

13. The system of claim 9, wherein automatically determining an extent to which the monitored processes comply with the IT standard further comprises automatically determining whether an amount of data requested matches an amount of data entered.

14. The system of claim 9, wherein automatically determining an extent to which the monitored processes comply with the IT standard further comprises comparing an actual number of security breaches to a threshold number of security breaches associated with the compliance parameters.

15. The system of claim 9, wherein automatically determining an extent to which the monitored processes comply with the IT standard further comprises comparing an actual number of security breaches to a threshold number of security breaches associated with the compliance parameters.

16. The system of claim 9, wherein the operations comprise:
   determining that the monitored processes fail to comply with the IT standards, then generating and transmitting a message to one or more individuals associated with governing the processes.

17. A computer storage medium encoded with a computer program, the program comprising instructions that when executed by one or more computers cause the one or more computers to perform operations comprising:
   monitoring one or more processes being performed by information technology (IT) support personnel, wherein the processes are performed using an interactive process map that guides the IT support personnel through resolving an IT issue or providing an IT solution; and
   receiving a request for a compliance report, then:
      receiving, from the monitored processes, real-time data that specifies an actual amount of time taken for the IT support personnel to reach a particular step in the process map,
      automatically determining an extent to which the monitored processes comply with the IT standard by comparing the received real-time data to one or more compliance parameters associated with an IT standard, wherein the one or more compliance parameters specify a predefined threshold time associated with reaching the particular step in the process map, and
      generating a compliance report that specifies the extent to which the monitored processes comply with the IT standard.

18. The medium of claim 17, wherein generating a compliance report that specifies an extent to which the monitored processes comply with the IT standard comprises generating a compliance report that specifies an extent to which the monitored processes comply with the Control Objectives for Information and related Technology (COBIT) standard.

* * * * *